US011498076B2

(12) United States Patent
Dulaff et al.

(10) Patent No.: US 11,498,076 B2
(45) Date of Patent: Nov. 15, 2022

(54) METHODS AND APPARATUS FOR RAPID HEATING OF BIOLOGICAL SPECIMENS

(71) Applicant: Siemens Healthcare Diagnostics Inc., Tarrytown, NY (US)

(72) Inventors: Paul Dulaff, Columbia, NJ (US); Christopher Delametter, Southbury, CT (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 387 days.

(21) Appl. No.: 16/608,141

(22) PCT Filed: May 2, 2018

(86) PCT No.: PCT/US2018/030696
§ 371 (c)(1),
(2) Date: Oct. 24, 2019

(87) PCT Pub. No.: WO2018/208563
PCT Pub. Date: Nov. 15, 2018

(65) Prior Publication Data
US 2021/0101154 A1  Apr. 8, 2021

Related U.S. Application Data

(60) Provisional application No. 62/503,566, filed on May 9, 2017.

(51) Int. Cl.
*G01N 35/02* (2006.01)
*G01N 35/04* (2006.01)
*G01N 35/00* (2006.01)
*B01L 7/02* (2006.01)

(52) U.S. Cl.
CPC .............. *B01L 7/02* (2013.01); *G01N 35/025* (2013.01); *G01N 35/04* (2013.01);
(Continued)

(58) Field of Classification Search
CPC ................ B01L 7/02; B01L 2200/147; B01L 2300/1822; B01L 2300/1827;
(Continued)

(56) References Cited

U.S. PATENT DOCUMENTS 3,280,904 A    10/1966  Hings
2006/0276972 A1  12/2006  Light et al.
(Continued)

FOREIGN PATENT DOCUMENTS

CN    101370622 A      2/2009
CN    201658986 U  *  12/2010
(Continued)

OTHER PUBLICATIONS

Partial EP Search Report dated Mar. 12, 2020 of corresponding European Application No. 18798181.6, 6 Pages.
(Continued)

*Primary Examiner* — Benjamin R Whatley
*Assistant Examiner* — John McGuirk

(57) ABSTRACT

Methods of pre-heating a test vessel prior to transfer of the test vessel to an incubator may shorten an incubation cycle, ensure proper temperature of a test specimen in the test vessel, and/or improve testing accuracy and/or throughput in a bio-liquid specimen testing apparatus. The methods include providing a test vessel pre-heating apparatus having a receptacle sized to receive a test vessel therein and having at least one heating unit configured to heat by direct conduction at least one side of the test vessel. The methods also include heating at least one side of the test vessel via direct contact using the at least one heating unit. Specimen testing apparatus and test vessel pre-heating apparatus configured to carry out the method are described, as are other aspects.

12 Claims, 5 Drawing Sheets

(52) U.S. Cl.
CPC . *B01L 2200/147* (2013.01); *B01L 2300/1822* (2013.01); *B01L 2300/1827* (2013.01); *B01L 2300/1883* (2013.01); *G01N 2035/00376* (2013.01); *G01N 2035/00445* (2013.01); *G01N 2035/0406* (2013.01); *G01N 2035/0453* (2013.01)

(58) Field of Classification Search
CPC ..... B01L 2300/1883; B01L 2300/1805; B01L 7/00; G01N 35/025; G01N 35/04; G01N 2035/00376; G01N 2035/00445; G01N 2035/0406; G01N 2035/0453; G01N 2035/0467; F28C 3/005
See application file for complete search history.

(56) References Cited

U.S. PATENT DOCUMENTS

| | | |
|---|---|---|
| 2013/0008884 A1 | 1/2013 | Schulz et al. |
| 2014/0112829 A1 | 4/2014 | Thomas et al. |
| 2016/0178654 A1 | 6/2016 | Silbert et al. |

FOREIGN PATENT DOCUMENTS

| | | | |
|---|---|---|---|
| EP | 3258060 A1 * | 12/2017 | ............. G01N 25/18 |
| JP | H03-123643 A | 5/1991 | |
| JP | H09-189703 A | 7/1997 | |
| JP | H09189703 A * | 7/1997 | |
| JP | 2001-504692 A | 4/2001 | |
| JP | 2005-066383 A | 3/2005 | |
| JP | 2012-152733 A | 8/2012 | |
| JP | 2013-246090 A | 12/2013 | |
| WO | 98/20106 A1 | 5/1998 | |
| WO | 2004/018105 A1 | 3/2004 | |
| WO | 2014/001531 A2 | 1/2014 | |
| WO | 2015/069544 A1 | 5/2015 | |

OTHER PUBLICATIONS

PCT International Search Report and Written Opinion dated Jul. 18, 2018 (10 Pages).

* cited by examiner

METHODS AND APPARATUS FOR RAPID HEATING OF BIOLOGICAL SPECIMENS

CROSS-REFERENCE TO RELATED APPLICATIONS

This application claims priority to U.S. provisional application Ser. No. 62/503,566 filed on May 9, 2017, the contents of which is incorporated herein by reference in its entirety.

FIELD

This disclosure relates to heating of biological specimens in testing equipment and methods thereof.

BACKGROUND

A wide variety of automated diagnostic instruments (e.g., chemical analyzers or immunoassay instruments) are used to analyze patient specimens. These diagnostic instruments may conduct assays or testing using one or more reagents or other additions to identify one or more analytes in, or characteristics of, a biological liquid such as urine, blood serum or plasma, cerebrospinal liquids, and the like (hereinafter "bio-liquid").

For certain tests, the bio-liquid may be a serum or plasma portion obtained from whole blood by centrifugation. After centrifuging and subsequent de-capping, the open sample container (e.g., sample tube) may be transported to, or otherwise reside in, a support article, such as a sample rack. The sample rack may be accessible by a pipette of an aspirating system that may extract the bio-liquid and dispense the bio-liquid into a test vessel (e.g., a cuvette or other container) that may reside in a carrier (e.g., a cuvette-carrying ring). The bio-liquid may be combined in the test vessel with one or more reagents and possibly other components such as magnetic particles and/or a diluent to make up a test specimen. Upon combination, the test specimen is incubated and reacted. During incubation, the test specimen in the test vessel is exposed to a controlled heated environment contained around the cuvette ring. After a suitable incubation time has elapsed and possibly other processes have taken place (e.g., a washing and/or elution buffer addition), analytical measurements may then be performed using, e.g., photometric or fluorometric readings or the like. The measurements allow determination of end rate values from which an amount of analyte or other substance in the test specimen may be determined using well-known techniques.

However, existing systems may include certain anomalies and/or difficulties that may be related to the heating of the test specimen during incubation. Furthermore, conventional systems lack sample temperature compensation functionality. This function is typically handled manually, as needed, by running calibrators at room and refrigerated temperatures, respectively. Since a sample can be at room temperature or at refrigerated temperature subsequently for each re-run, the different sample temperatures can offset the reaction kinetics and result in a different reading even for the same assay kit on the same instrument. Thus, there is a need for improved methods and apparatus for incubating test specimens.

SUMMARY

According to a first embodiment, heating apparatus of a specimen testing apparatus is provided, wherein the specimen testing apparatus includes a sample rack of bio-liquid containers and an incubator. The heating apparatus includes a test vessel pre-heating apparatus that includes (1) a receptacle sized to receive a test vessel therein and (2) at least one heating unit configured to heat by direct contact a side of the test vessel.

According to another embodiment, a specimen testing apparatus is provided. The specimen testing apparatus includes a test vessel pre-heating apparatus that includes at least one heating unit configured to heat by direct contact a side of a test vessel, one or more transfer robots configured to transfer the test vessel to and from the test vessel pre-heating apparatus, an incubator having a heated air environment, and one or more pipette robots configured to aspirate and dispense a bio-liquid, a reagent, a magnetic particles solution, or a diluent from a respective container to the test vessel located in the test vessel pre-heating apparatus.

According to another embodiment, a method of pre-heating a test vessel in a specimen testing apparatus is provided. The method includes providing a test vessel pre-heating apparatus that includes (1) a receptacle sized to receive a test vessel therein and (2) at least one heating unit configured to heat by direct contact a side of the test vessel. The method also includes heating the side of the test vessel via direct contact using the at least one heating unit.

Still other aspects, features, and advantages of this disclosure may be readily apparent from the following detailed description by illustrating a number of example embodiments and implementations, including the best mode contemplated for carrying out the present invention. The present disclosure may also be capable of other and different embodiments, and its several details may be modified in various respects. Accordingly, the drawings and descriptions are to be regarded as illustrative in nature, and not as restrictive. The drawings are not necessarily drawn to scale. This disclosure is to cover all modifications, equivalents, and alternatives falling within the scope of the appended claims.

DETAILED DESCRIPTION

Figure 1:
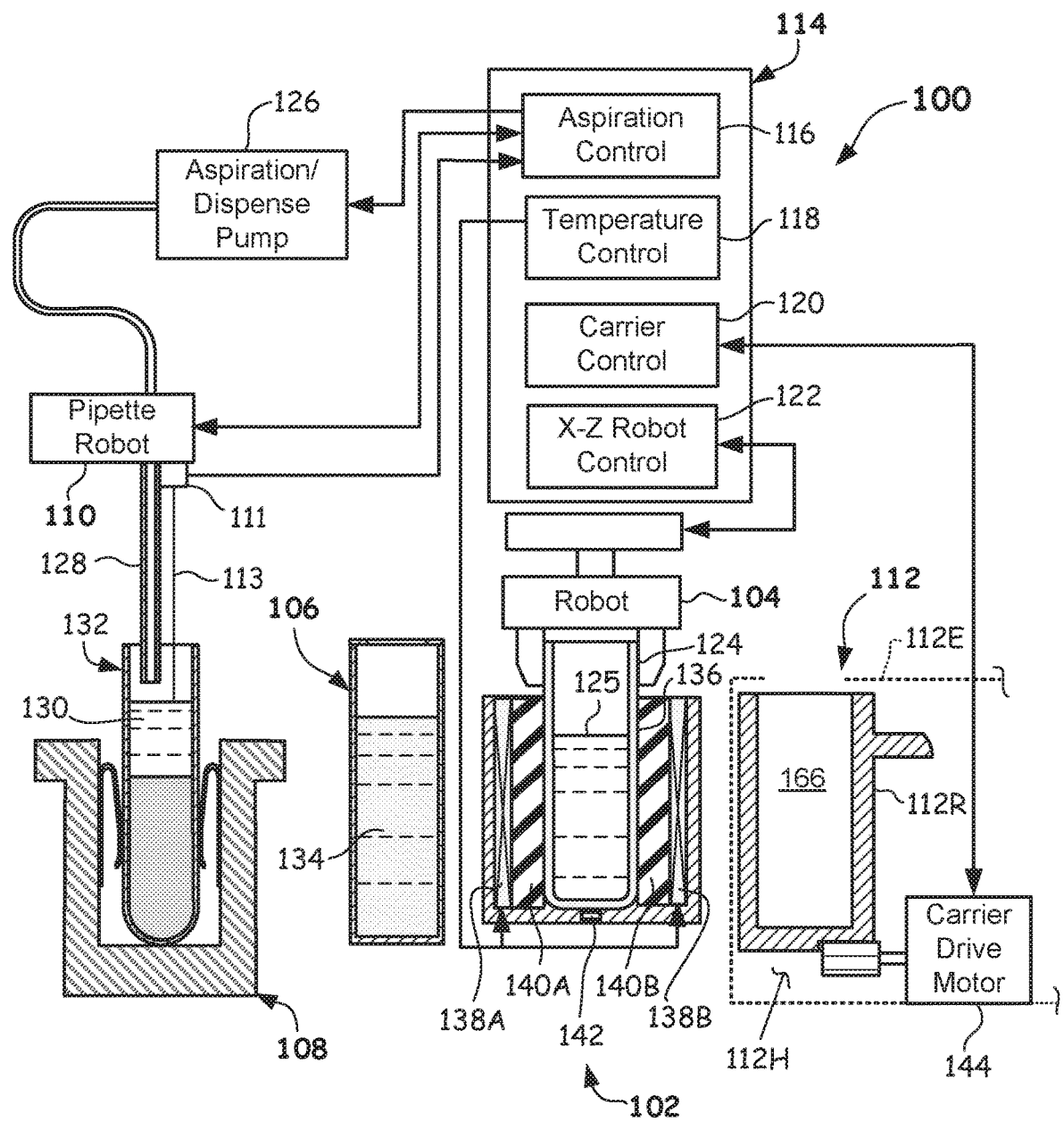
FIG. 1 illustrates a schematic side view of a specimen testing apparatus that includes specimen pre-heating according to embodiments.

In some analytical testing of test specimens that include a bio-liquid such as, e.g., urine, blood serum or plasma, cerebrospinal liquids, and the like, the test specimen may need to be heated to and/or maintained at a defined temperature in order to, e.g., preserve sample integrity, allow the components of the test specimen to properly react with each other, and/or improve accuracy of test results. To accomplish this, the test specimens may be placed in an incubator (e.g., an incubation carrier ring) of the diagnostic instrument prior to testing to raise and/or maintain (by convective heating) the test specimen temperature to or at the defined temperature. The incubation carrier ring may provide a heated air environment. However, as initial fluid temperatures and test specimen volumes may vary, so may the needed incubation time. Thus, some test specimens may not reach the defined temperature, or the incubation time required to raise the test specimen temperature to the defined temperature may adversely affect analytical testing throughput (i.e., the number of test specimens tested per unit time). Therefore, reducing incubation time while achieving the defined temperature may result in increased testing accuracy and throughput and reduced costs. Accordingly, in a first broad aspect, embodiments of the present disclosure provide methods and apparatus to pre-heat a test vessel (e.g., a cuvette or other test container) having a test specimen (or portion thereof) therein prior to transferring the test vessel to an incubator (e.g., to an incubation carrier ring).

According to one or more embodiments, a test vessel pre-heating apparatus may include a receptacle sized to receive at least one test vessel therein and one or more heating units (e.g., a pair of heating units) configured to heat by direct conduction (i.e., direct contact) one or more sides, and preferably opposite sides of the test vessel. Each of the one or more heating units (e.g., pair of heating units) may include a heating element and a pliable thermally conductive insulator (e.g., a conductive elastomer material) attached to the heating element. In some embodiments, the pair of heating units may engage opposite sides of the test vessel such that the pliable thermally conductive insulator is disposed between, and in contact with, each heating element and a respective side of the test vessel to directly conduct heat into the test vessel. In some embodiments, the one or more heating units (e.g., pair of heating units) may include heated plates. In some embodiments, one or more heating elements may be a Peltier heater, which may also be capable of removing heat (i.e., cooling) in those cases where the test vessel temperature exceeds the defined temperature. In one or more embodiments, the test vessel pre-heating apparatus may include a receptacle comprising one or more movable walls configured to clamp the one or more heating units against the opposite sides of the test vessel.

In one or more embodiments, a specimen testing apparatus may include one or more pipette robots for aspirating and dispensing various liquids in preparation of the test specimen in the test vessel prior to placement in the incubator. The liquids may include, e.g., a bio-liquid, one or more reagents, a magnetic particle solution, and/or a diluent. Specimen testing apparatus in accordance with one or more embodiments may also include one or more transfer robots for transferring the test vessel between a test vessel supply and the test vessel pre-heating apparatus, and transferring the test vessel from the test vessel pre-heating apparatus and the incubator (e.g., incubator ring).

These and other aspects and features of embodiments of the disclosure will be described with reference to FIGS. 1-4 herein.

FIG. 1 illustrates a specimen test apparatus 100 that includes test vessel pre-heating according to embodiments. Specimen test apparatus 100 may include a test vessel pre-heating apparatus 102, a transfer robot 104, a reagent container 106, a sample rack 108, a pipette robot 110, an incubator 112, and a system controller 114. Other conventional components of specimen test apparatus 100 are not shown, such as, e.g., a wash station, a test vessel supply, a pipette tip storage, one or more testing devices (e.g., a luminometer or other optical testing system), etc.

System controller 114 may include aspiration control 116, temperature control 118, carrier control 120, and X-Z robot control 122, any one or more of which may be a separate controller or other dedicated hardware and corresponding software operating under the overall control of system controller 114, or any one or more of which may comprise software alone executing on a processor in system controller 114.

X-Z robot control 122 may be configured (e.g., programmed) to operate transfer robot 104 to move, e.g., in the X (left-right as shown) and Z (up-down as shown) directions. Movement in the Y direction (into and out of the page as shown) may also be possible in other embodiments. Further, in some embodiments, the transfer robot 104 may be an R-theta robot. Transfer robot 104 may be configured to transfer a test vessel 124, which may be, e.g., a cuvette, test vial or cup, or like test container, from a test vessel supply (not shown in FIG. 1, but see FIG. 3) to test vessel pre-heating apparatus 102 and from test vessel pre-heating apparatus 102 to incubator 112. Upon transferring test vessel 124 to test vessel pre-heating apparatus 102, transfer robot 104 may return to a home position (not shown), providing access to the top of test vessel 124 by pipette robot 110.

Aspiration control 116 may be configured (e.g., programmed) to operate aspiration/dispense pump 126, pipette robot 110, and a pipette 128. Aspiration/dispense pump 126 may be a piston-type pump that may be driven by a suitable motor (not shown) coupled thereto, such as a stepper motor. Other types of pumps may be used. Pipette robot 110 may be configured to carry out motion of pipette 128 in one or more coordinate directions, such as in the X, Y, and Z directions. In some embodiments, pipette robot 110 may include a laser depth finder 111 that may emit a laser beam 113 to determine a depth of a liquid in a container to allow aspiration control 116 to determine an appropriate depth at which to insert pipette 128 into the container to perform an aspiration. Other suitable depth finder devices may be used by pipette robot 110. Note that other conventional components, such as, e.g., one or more valves, accumulators, distributors, pressure sensors, and/or other hydraulic components used to perform liquid aspiration/dispense operations are not shown, and that any suitable apparatus for aspirating and dispensing liquids into and out of pipette 128 may be used.

Aspiration control 116 may be configured to aspirate (i.e., draw in) a volume of bio-liquid 130 (e.g., serum or plasma) from a bio-liquid sample container 132 located in sample rack 108 into pipette 128. Bio-liquid sample container 132 may be a blood collection tube and may include a bio-liquid 130 such as serum or plasma that has been separated (e.g., fractionated) by centrifugation, for example. Aspiration control 116 may also be configured to dispense that bio-liquid volume into test vessel 124 located in test vessel pre-heating apparatus 102. Aspiration control 116 may further be configured to aspirate a volume of reagent 134 from reagent container 106 (after, e.g., washing a previously-used pipette 128) and to dispense that reagent volume into test vessel 124 located in test vessel pre-heating apparatus 102. In some embodiments, aspiration control 116 may still further be configured to aspirate one or more volumes of other liquids, such as a diluent, magnetic particle solution, or other reagents (none shown) and to dispense those one or more volumes into test vessel 124 located in test vessel pre-heating apparatus 102. In some embodiments, a separate pipette robot (not shown) may be used for aspiration and/or dispense of the reagent 134 and/or other fluids. Upon completion of one or more of the aforementioned aspiration/ dispense operations, test vessel 124 may contain a test specimen 125 therein. Test specimen 125 may thus include, e.g., one or more of a bio-liquid, one or more reagents, a diluent, and/or a magnetic particle solution.

Test vessel pre-heating apparatus 102 may include a receptacle 136 sized to receive test vessel 124 therein. Test vessel pre-heating apparatus 102 may also include a pair of heating units including heating elements 138A and 138B. The heating units are configured to heat by direct conduction opposite sides of test vessel 124. The heating units of the test vessel pre-heating apparatus 102 may further include pliable thermally conductive insulators 140A and 140B each attached to and in contact with respective heating elements 138A and 138B. Heating element 138A and pliable thermally conductive insulator 140A may form a first heating unit, and heating element 138B and pliable thermally conductive insulator 140B may form a second heating unit. Pliable thermally conductive insulators 140A and 140B may be configured to be disposed between respective heating elements 138A and 138B and respective opposite sides of test vessel 124 as shown in FIG. 1. In some embodiments, pliable thermally conductive insulators 140A and 140B may be in complete surface contact with respective opposite sides of test vessel 124 to provide for direct heat conduction to test vessel 124. For example, in some embodiments, there may be a slight interference fit between the receptacle 136 and the test vessel 124 so that a snug fit is provided therein and providing intimate contact along the opposing sides. Test vessel 124 may, in some embodiments, have a square or rectangular shape and/or opposites sides that are predominately co-planar. Test vessel 124 may have other suitable shapes or side configurations. Pliable thermally conductive insulators 140A and 140B may be made of an elastomer material and/or may be a composite of silicone rubber and fiberglass and may include a conductive material or filler therein. Pliable thermally conductive insulators 140A and 140B may have a thickness ranging from 0.005 inches (0.0127 mm) to 0.015 inches (0.0381 mm). In some embodiments, pliable thermally conductive insulators 140A and 140B may be Sil-Pads®.

Heating elements 138A and 138B may each be controlled by temperature control 118 and may each be capable of being heated to a temperature ranging from about 35 degrees C. to about 40 degrees C. In some embodiments, the heating elements 138A and 138B may each be controlled to an even higher temperature. In some embodiments, heating elements 138A and 138B may include a heatable plate (a thermal mass). The heatable plates may be made of a high thermal conductance material, such as copper or aluminum. Other suitable thermally conductive materials may be used for the heatable plates. In other embodiments, heating elements 138A and 138B may each be a Peltier heater, which may be operative to heat and to cool. That is, applying a voltage to the Peltier heater may cause a first side to provide heat and a second opposite side to provide cooling, wherein reversing the polarity of the voltage applied to the Peltier heater may then cause the first side to provide cooling and the second opposite side to provide heat. Thus, both heating and cooling of the test vessel 124 may be provided as needed. For example, in those cases where the temperature of test vessel 124 exceeds a desired temperature, cooling may be provided by test vessel pre-heating apparatus 102. Other suitable types of heaters, such as resistive heaters, fluid or steam flow passage heaters, may be used in test vessel pre-heating apparatus 102 to provide a localized and controlled heating source(s).

In alternative embodiments, test vessel pre-heating apparatus 102 may only include only one heating unit (i.e., one of heating elements 138A and 138B and one of corresponding pliable thermally conductive insulators 140A and 140B; for example, only heating element 138A and pliable thermally conductive insulator 140A or only heating element 138B and pliable thermally conductive insulator 140B). Accordingly, in those alternative embodiments, test vessel pre-heating apparatus 102 may only provide heating (and in some embodiments cooling) on one side of test vessel 124, which may be less effective and/or efficient than providing heating (and in some embodiments cooling) on opposite sides of test vessel 124.

In some embodiments, test vessel pre-heating apparatus 102 may include feedback of temperature information to a temperature control algorithm operating in temperature control 118. For example, the test vessel pre-heating apparatus 102 may include at least one temperature sensor 142 coupled to temperature control 118 (connection not shown for clarity) and configured to sense a representative temperature of test vessel 124. In one or more embodiments, temperature sensor 142 may be positioned to obtain a representative temperature of the test vessel 124. For example, in some embodiments, the temperature sensor 142 may be in thermal contact with test vessel 124 at any suitable location. Other suitable locations for one or more temperature sensors 142 on or within test vessel pre-heating apparatus 102 may be used. The temperature sensor 142 may be a thermocouple, a resistive temperature device (RTD), a thermistor, an infrared (IR) sensor, or the like. In response to receiving a temperature value from temperature sensor 142, temperature control 118 may be configured to control an amount of heat provided by heating elements 138A and 138B such as, e.g., by turning heating elements 138A and 138B on or off as needed (e.g., where heating elements 138A and 138B may be fixed or variable temperature heatable plates) or by adjusting a voltage (e.g., its value and/or polarity) applied to heating elements 138A and 138B (e.g., where heating elements 138A and 138B may be Peltier heaters) in order to maintain a set temperature, such as, e.g., a temperature ranging from about 35 degrees C. to about 40 degrees C. Other temperature ranges are possible. The control may be accomplished by any suitable temperature control algorithm such as on-off feedback control, proportional integral derivative (PID) control, feedforward or other model-based control, or the like.

The temperature control algorithm will use thermal sensor and assay volume data to drive and control the heaters/Peltiers. The data comprises, for example, the sample temperature measured via an infrared sensor, or equivalent, at the sample tube, the dispensed sample volume, the empty cuvette temperature, and the reagent volume. The reagent temperature is assumed consistent, since these materials are refrigerated on board and the cuvettes have a known mass and material specific heat value. Thus these parameters typically need no measurement.

Figure 3:
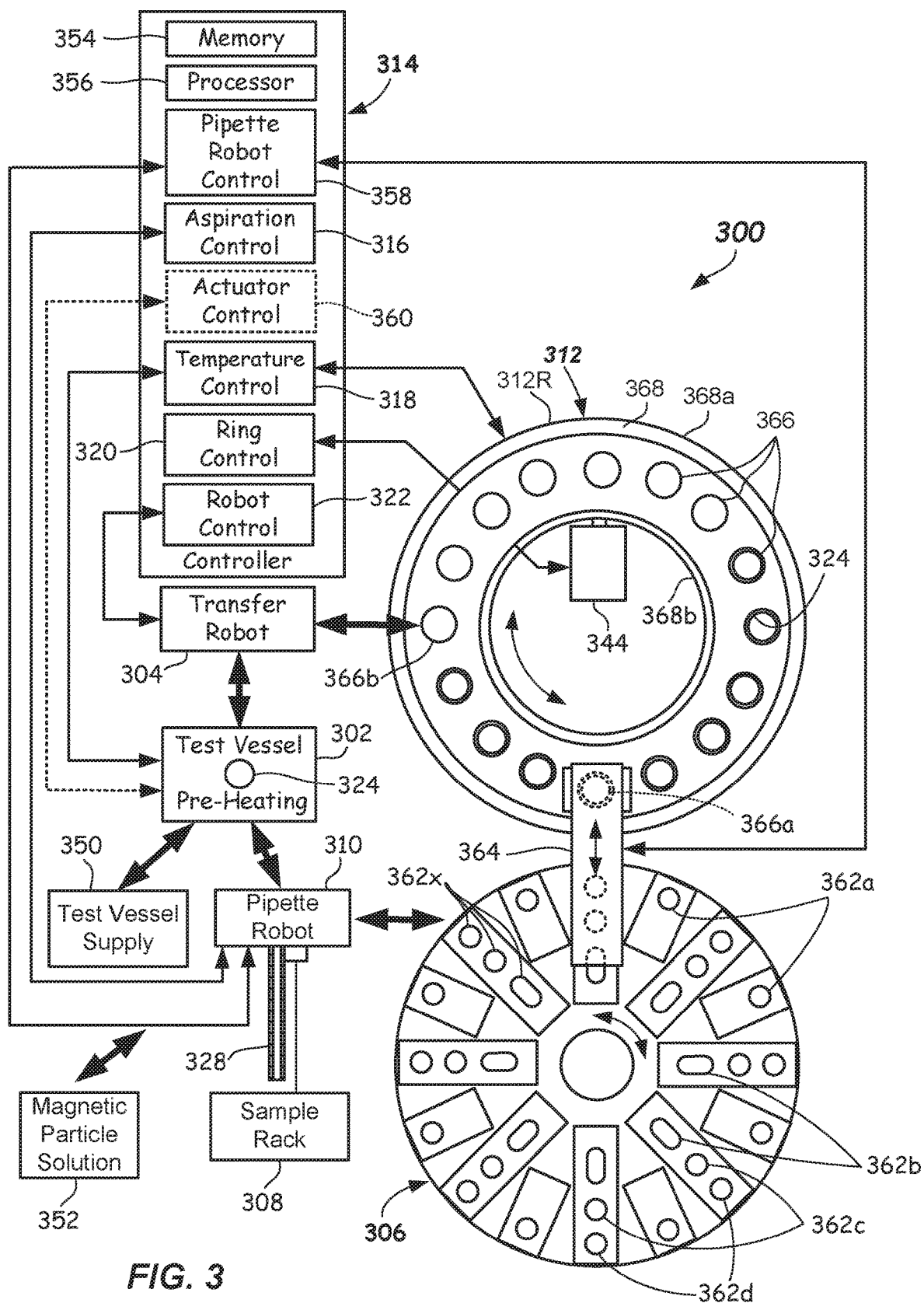
FIG. 3 illustrates a schematic top view of specimen testing apparatus including pre-heating apparatus configured to receive and preheat a test specimen prior to being transferred to an incubation carrier ring according to embodiments.

In response to completing the preparation of test specimen 125 in test vessel 124 via the aforementioned aspiration/dispense operations, and in response to heating test vessel 124 via heating elements 138A and 138B either for a predetermined amount of time or until a desired temperature (such as, e.g., 37 degrees C.) is reached as indicated by temperature sensor 142, X-Z robot control 122 may be configured to operate transfer robot 104 to transfer test vessel 124 to incubator 112, which may be an incubation carrier ring 112R having multiple test vessel receiving locations 166 (see also, e.g., incubation carrier ring 312 of FIG. 3). Incubator 112 may include an incubator enclosure 112E that surrounds the incubation carrier ring 112R and contains a heated chamber 112H therein for incubation of the test specimen 125 when received therein. After receipt of test vessel 124 in incubator 112 through opening in incubator enclosure 112E, carrier control 120 may be configured to move (e.g., rotate) incubation carrier ring 112R via carrier drive motor 144 to other positions within specimen test apparatus 100 for an incubation period prior to testing the test specimen in test vessel 124.

Figure 2A:
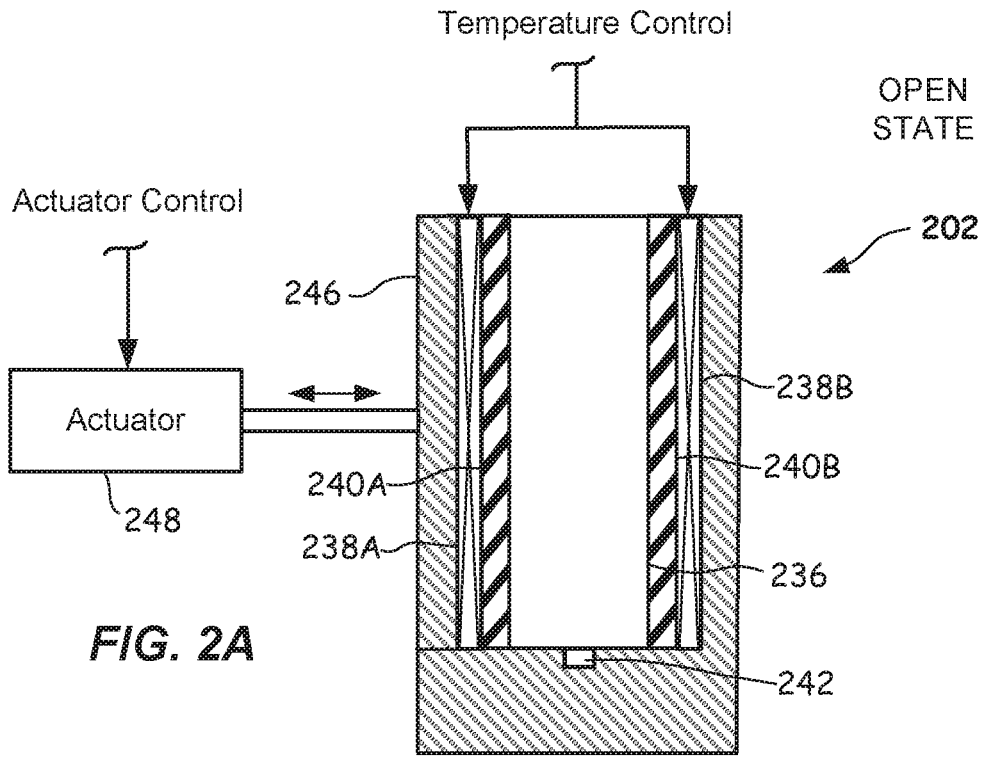
FIGS. 2A-2C illustrate partially cross-sectioned schematic side plan views of test vessel pre-heating apparatus according to embodiments.
Figure 2B:
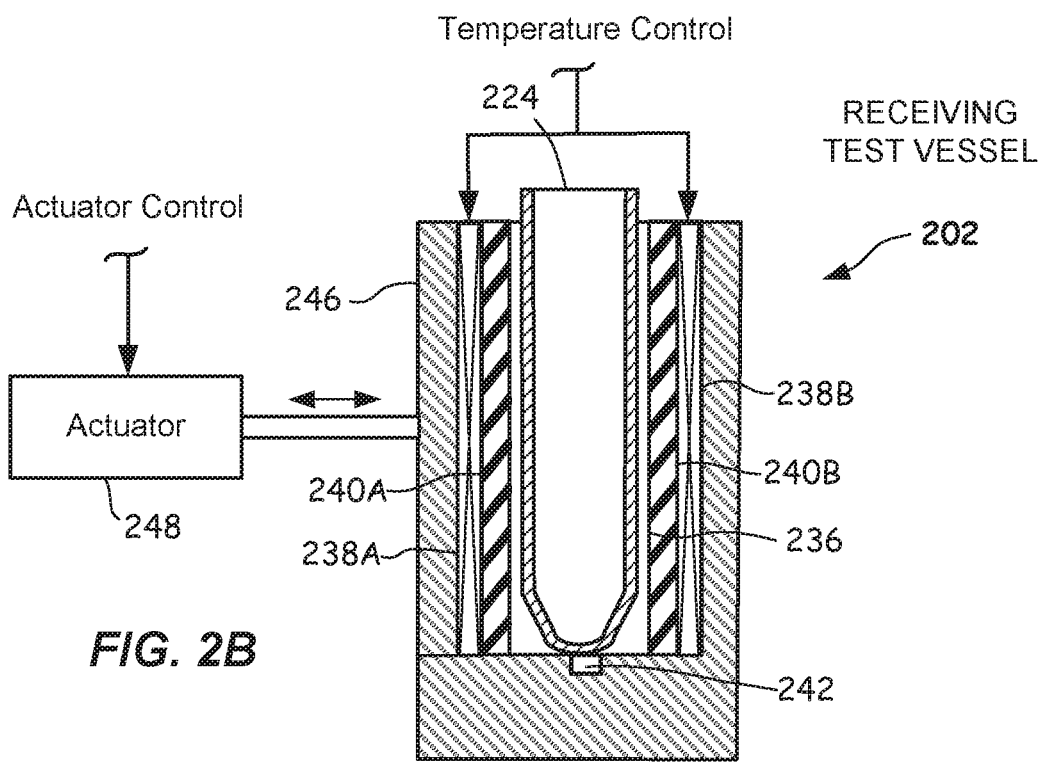
Figure 2C:
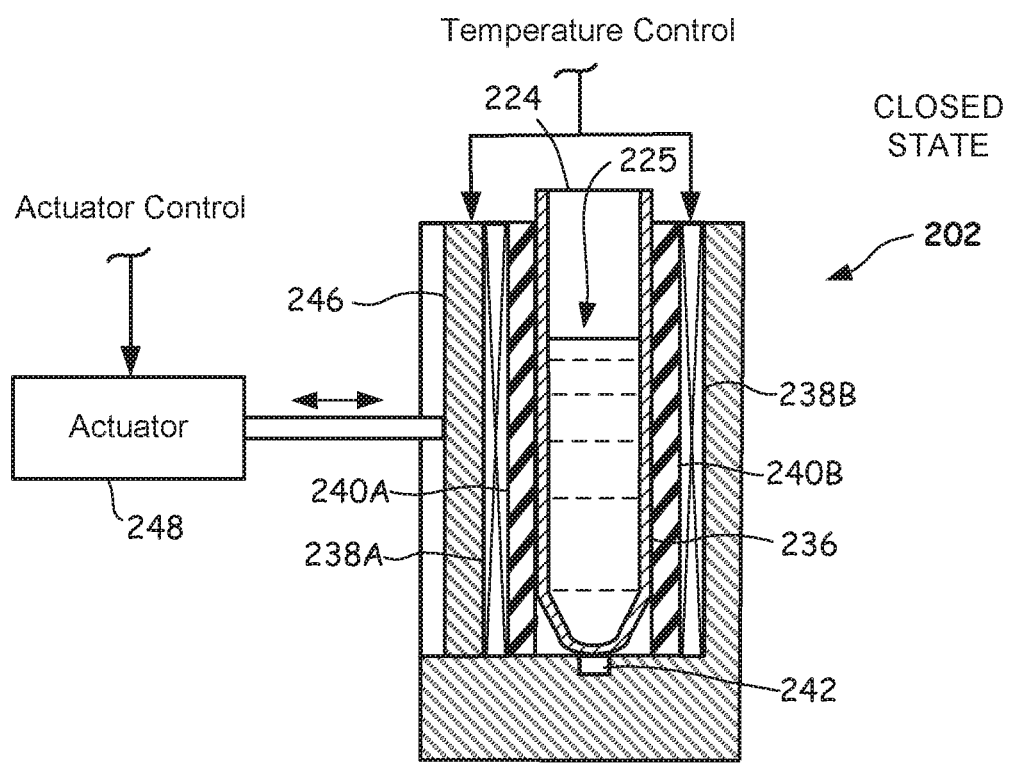

FIGS. 2A-2C illustrate a test vessel pre-heating apparatus 202 according to further embodiments. Test vessel pre-heating apparatus 202 may include a receptacle 236, one or more heating elements (e.g., a pair of heating elements 238A and 238B), one or more pliable thermally conductive insulators (e.g., a pair of pliable thermally conductive insulators 240A and 240B attached respectively to heating elements 238A and 238B), at least one temperature sensor 242 (optional), a movable wall 246 upon which heating element 238A may be mounted, and an actuator 248 that may be configured to move the movable wall 246 in response to control signals received from a system controller, such as, e.g., system controller 114 (of FIG. 1) or, in some embodiments, an actuator control of a system controller. In some embodiments, test vessel pre-heating apparatus 202 may have more than one movable wall, such as, e.g., a movable wall on each opposite side of a test vessel. Heating elements 238A and 238B, pliable thermally conductive insulators 240A and 240B, and temperature sensor 242 may be identical or similar to heating elements 138A and 138B, pliable thermally conductive insulators 140A and 140B, and temperature sensor 142 described with reference to FIG. 1. Heating element 238A and pliable thermally conductive insulator 240A may form a first heating unit, and heating element 238B and pliable thermally conductive insulator 240B may form a second heating unit. Heating elements 238A and 238B and temperature sensor 242 may each be coupled to a temperature control, such as, e.g., temperature control 118 (of FIG. 1), of a system controller, which may control the operation of heating elements 238A and 238B in a similar or identical manner as heating elements 138A and 138B of FIG. 1.

FIG. 2A illustrates test vessel pre-heating apparatus 202 prior to receiving a test vessel 224 therein. As shown, movable wall 246 may be in an open position, and receptacle 236 may be accordingly configured to receive a test vessel therein. In some embodiments, heating elements 238A and 238B may remain on (i.e., providing heat) while test vessel pre-heating apparatus 202 is in an open state awaiting receipt of a test vessel 224. FIG. 2B illustrates test vessel pre-heating apparatus 202 with test vessel 224 received therein and movable wall 246 still in the open position. Test vessel 224 may be identical or similar to test vessel 124 and may have been transferred to test vessel pre-heating apparatus 202 via a transfer robot, such as, e.g., transfer robot 104. Note that such a transfer robot (not shown) may still be holding the test vessel 224 at this stage. As such, a space may exist between each of the opposite sides of test vessel 224 and respective pliable thermally conductive insulators 240A and 240B. FIG. 2C illustrates test vessel pre-heating apparatus 202 in a closed state. In the closed state, actuator 248 has moved the movable wall 246 inward against test vessel 224 such that the opposite sides of test vessel 224 are in direct contact with, and in some embodiments, in complete surface contact with, respective pliable thermally conductive insulators 240A and 240B. This may facilitate heating of test vessel 224 via direct conduction. In response to moving the movable wall 246 into the closed state, the transfer robot may return to a home position and heating elements 238A and 238B may be activated to, e.g., provide heat, if not already activated. One or more aspiration/dispense operations as described above in connection with specimen test apparatus 100 may now be performed to provide test vessel 224 with a test specimen 225 therein. In response to completing the preparation of test specimen 225 in test vessel 224, and to the heating of the test vessel 224 via heating units either for a predetermined amount of time or until a desired temperature (such as, e.g., 37 degrees C.) is reached as indicated by temperature sensor 242, the test vessel 224 may be removed from test vessel pre-heating apparatus 202 and placed in the incubator (e.g., incubator 112) In some embodiments, the transfer robot, such as, e.g., transfer robot 104, may return and grasp the test vessel 224, and actuator 248 may return the movable wall 246 to the open position to allow the transfer robot to remove test vessel 224 from test vessel pre-heating apparatus 202 and then transfer the test vessel 224 containing test sample 225 to the incubator (e.g., incubator 112).

FIG. 3 illustrates a specimen testing apparatus 300 that includes specimen pre-heating according to embodiments. Specimen test apparatus 300 may include a test vessel pre-heating apparatus 302, a transfer robot 304, a reagent carousel 306, a sample rack 308 containing specimen containers including bio-fluid therein, a pipette robot 310, an incubator 312 including an incubation carrier ring 312R, a system controller 314, a test vessel supply 350, and a magnetic particle solution supply 352. System controller 314 may include a memory 354 and a processor 356. Memory 354 may be configured to store programming instructions, test results data, and/or other information/data. Processor 356 may be configured to execute programming instructions in connection with operation of specimen testing apparatus 300. System controller 314 may also include pipette robot control 358, aspiration control 316, optional actuator control 360 (if moveable wall is provided in test vessel pre-heating apparatus 302), temperature control 318, ring control 320, and transfer robot control 322, any one or more of which may be a separate controller or other dedicated hardware and corresponding software operating under the overall control of system controller 314, or any one or more of which may comprise software alone stored in memory 354 and executing on processor 356 in system controller 314.

Test vessel pre-heating apparatus 302 may be identical or similar to any of the embodiments of test vessel pre-heating apparatus 102, 202 described herein. For example, test vessel pre-heating apparatus 302 may be identical or similar to the test vessel pre-heating apparatus 202 (of FIGS. 2A-2C), wherein actuator control 360 may be operative to control an actuator of test vessel pre-heating apparatus 302, such as, e.g., actuator 248 (of FIGS. 2A-2C), to move a movable wall, such as, e.g., movable wall 246, to and from open and closed positions. Test vessel pre-heating apparatus 302 may alternatively be identical or similar to test vessel pre-heating apparatus 102 (of FIG. 1), in which case actuator control 360 may be omitted or not used. Operation of test vessel pre-heating apparatus 302 may otherwise be similar or identical to the operation of either test vessel pre-heating apparatus 202 or 102.

Reagent carousel 306 may include a plurality of reagent supplies 362a-d that may be added to a test vessel located in incubation carrier ring 312R. Reagent supplies 362a-d may be arranged radially around the center of reagent carousel 306 such that a gantry robot 364 including a pipette may access any one of the reagent supplies 362a-d properly positioned beneath gantry robot 364 via rotation of reagent carousel 306. Each of reagent supplies 362a, 362b, 362c, and/or 263d may be the same reagent or a different reagent. That is, e.g., reagent supplies 362a may each be the same reagent or a different reagent, while reagent supplies 362b may each be the same reagent or a different reagent, etc. Reagent supplies 362a-d may include other suitable combinations of the same and different reagent supplies.

Incubation carrier ring 312R may include a plurality of test vessel locations 366 (note that seven test vessel locations 366 are shown empty and nine test vessel locations 366 are shown with a test vessel 324 received therein). Test vessels 324 may be the same or similar as test vessels 124, 224 described herein. The test vessel locations 366 are shown round, but other shapes are possible depending on the shape of the test vessel 324. Further, in some embodiments more or less numbers of full and empty test vessel locations 366 are possible. Incubation carrier ring 312R may be housed within a heated chamber 312H (shown without a top cap extending over outside edge 368a and inside edge 368b). In some embodiments, heated chamber 312H may have at least two openings in the cap sized to receive a test vessel (e.g., test vessel 124, 224) there through. The at least two openings may be at a reagent-addition location 366a and a test vessel access location 366b. Other openings may be possible. The heated chamber 312H may be heated to heat the air space therein to a desired incubation temperature (e.g., to 36 degrees C.). Ring control 320 may be configured to rotate incubation carrier ring 312R via a carrier drive motor 344 to allow additional reagent to be added to a test vessel 324 positioned at reagent-addition location 366a and/or to receive a test vessel 324 at test vessel access location 366b for incubation. The test vessel 324 may be removed after incubation and testing at test vessel access location 366b or at another opening (not identified in FIG. 3). Other openings (not shown) may be used for wash operations and for specimen testing as is conventional.

Transfer robot control 322 and transfer robot 304 may be configured to transfer a test vessel, such as, e.g., test vessel 124, 224, or 324, from test vessel supply 350 to test vessel pre-heating apparatus 302 and from test vessel pre-heating apparatus 302 to test vessel access location 366b in incubation carrier ring 312R. In some embodiments, transfer robot control 322 and transfer robot 304 may optionally be configured to transfer a test vessel from incubation carrier ring 312R to a testing device (e.g., a luminometer or other optical testing device; not shown). In other embodiments, the testing takes place at a testing device (e.g., a luminometer or other optical testing device; not shown) located on the incubation carrier ring 312R. In other embodiments, a plurality of transfer robots 304 controlled by transfer robot control 322 may be used.

Pipette robot control 358 may be configured to operate pipette robot 310. In particular, pipette robot control 358 may be configured to position pipette robot 310 and a pipette 328 coupled to pipette robot 310 at a bio-liquid sample container residing in sample rack 308 to aspirate a bio-liquid from that bio-liquid sample container and to then position pipette robot 310 and pipette 328 at a test vessel 324 located in test vessel pre-heating apparatus 302 to dispense that bio-liquid into the test vessel 324. Pipette robot control 358 may also be configured to position pipette robot 310 and pipette 328 at magnetic particle solution supply 352 to aspirate a liquid from magnetic particle solution supply 352 and to then position pipette robot 310 and pipette 328 at a test vessel 324 located in test vessel pre-heating apparatus 302 to dispense that liquid into the test vessel 324. In some embodiments, pipette robot control 358 may further be configured to position pipette robot 310 and pipette 328 at one or more reagent positions 362x of reagent carousel 306 to aspirate a reagent from one of reagent supplies 362a-d positioned thereat and to then position pipette robot 310 and pipette 328 at a test vessel 324 located in test vessel pre-heating apparatus 302 to dispense that reagent into the test vessel 324. In other embodiments, a plurality of pipette robots 310 and pipettes 328 controlled by pipette robot control 358 may be used.

Additionally, in some embodiments, pipette robot control 358 may also be configured to operate gantry robot 364 and the reagent pipette associated therewith. For example, during an aspiration operation in conjunction with aspiration control 316 (described below), pipette robot control 358 may position gantry robot 364 such that a reagent pipette coupled to gantry robot 364 may be able to aspirate a volume of reagent from one of reagent supplies 362a-d properly positioned beneath gantry robot 364. Pipette robot control 358 may then position gantry robot 364 such that the reagent pipette is able to dispense the aspirated reagent to a test vessel 324 positioned at reagent-addition location 366a. In other embodiments, a gantry robot control (not shown) may be used instead of pipette robot control 358 to operate gantry robot 364.

Aspiration control 316 may be configured identically or similarly to aspiration control 116 (of FIG. 1) for performing aspiration/dispense operations using pipette 328 at sample rack 308, magnetic particle solution supply 352, reagent carousel 306, and test vessel pre-heating apparatus 302. Additionally, in some embodiments, aspiration control 316 may also be configured to perform aspiration/dispense operations using a reagent pipette of gantry robot 364 at reagent carousel 306 and incubation carrier ring 312. In other embodiments, combinations of the pipette robot 310 and the gantry robot 364 may be used.

Temperature control 318 may be configured identically or similarly to temperature control 118 (of FIG. 1) for controlling one or more heating units (not shown) of the test vessel pre-heating apparatus 302. Additionally, in some embodiments, temperature control 318 may also be configured to control the heating of heated chamber 312H such that the temperature therein is maintained at a desired temperature, which may range from about 36 degrees C. to about 38 degrees C. in some embodiments wherein, in one or more embodiments, temperature control may be set to 36 degrees C.+/−0.5 degrees C.

Figure 4:
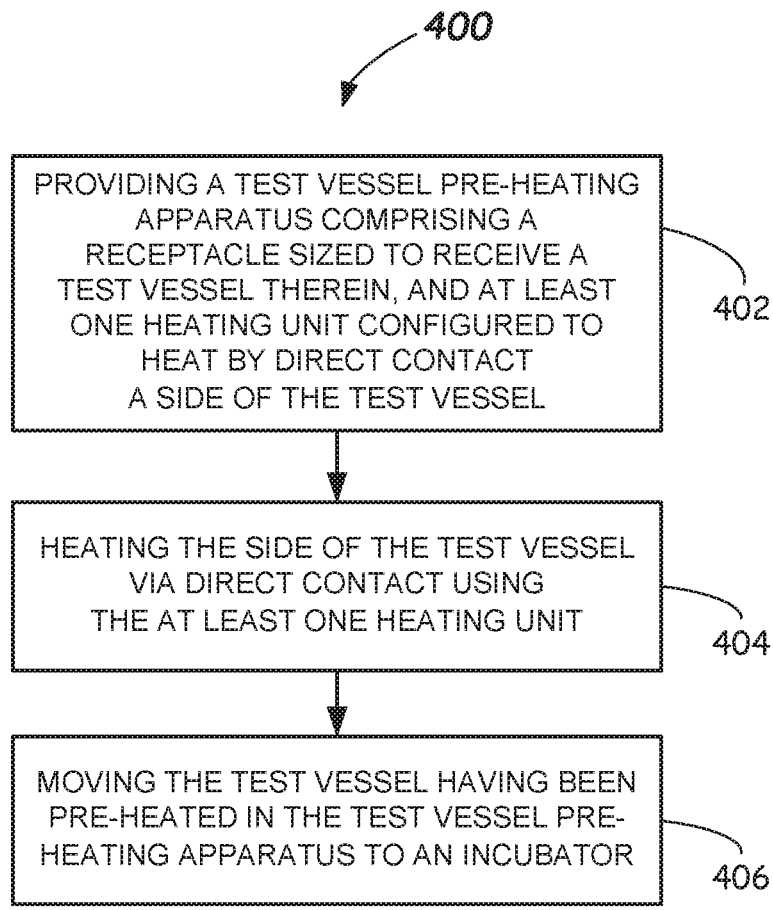
FIG. 4 illustrates a flowchart of a method of pre-heating a test vessel in a specimen testing apparatus according to embodiments.

FIG. 4 illustrates a method 400 of pre-heating a test vessel in a specimen testing apparatus according to one or more embodiments. Method 400 may be performed by one or more controllers, such as, e.g., system controller 114 (of FIG. 1) and/or system controller 314 (of FIG. 3). At process block 402, method 400 may include providing a test vessel pre-heating apparatus comprising a receptacle (e.g., receptacle 136, 236) sized to receive a test vessel (e.g., test vessel 124, 224, 324) therein and at least one heating unit (e.g., a pair of heating units) configured to heat by direct conduction opposite sides of the test vessel. For example, the test vessel pre-heating apparatus may be any one of test vessel pre-heating apparatus 102, 202, or 302.

At process block 404, method 400 may include heating a side of the test vessel (e.g., the opposite sides of the test vessel) via direct conduction via direct contact with the at least one heating unit, such as by using the pair of heating units. For example, heating elements 138A and 138B (of FIG. 1) or heating elements 238A and 238B (of FIG. 2) may be used to heat via direct conduction the opposite sides of test vessel 124 or 224.

The method 400 may further include, in block 406, moving the test vessel having been preheated in the test vessel pre-heating apparatus to an incubator.

In one or more embodiments, method 400 may include one or more of the following: providing the at least one heating unit with a thermally conductive insulator in direct thermal contact with at least one heating element and a respective side of the test vessel, placing a test vessel in the receptacle via a transfer robot prior to heating at process block 404, dispensing one or more liquids into the test vessel to form a test specimen, moving at least one movable wall of the receptacle to clamp one or more heating units against the opposite sides of the test vessel, receiving temperature values at a temperature controller from one or more temperature sensors and controlling an amount of heat provided by the one or more heating units via the temperature controller in response to the received temperature values, and/or transferring a heated test vessel from the test vessel pre-heating apparatus to an incubator via a transfer robot.

Advantages of pre-heating a test vessel containing a test specimen therein in a test vessel pre-heating apparatus according to one or more of the embodiments described herein may include achieving a desired test specimen temperature, allowing components of a test specimen to properly react with each other, preserving test specimen integrity, shortening test specimen incubation periods, increasing testing throughput, increasing testing accuracy, decoupling patient sample and reaction vessel temperature variability, and/or reducing testing costs.

Having shown the preferred embodiments, those skilled in the art will realize many variations are possible that will still be within the scope of the claimed invention. Therefore, it is the intention to limit the invention only as indicated by the scope of the claims.

What is claimed is:

1. A heating apparatus of a specimen testing apparatus, the specimen testing apparatus including a sample rack of bio-liquid containers and an incubator, the heating apparatus comprising:
   a test vessel pre-heating apparatus comprising:
      a receptacle sized to receive a test vessel therein; and
      at least one heating unit positioned inside the receptacle and configured to be in direct contact with, and to heat by direct contact, a side of the test vessel;
      wherein the receptacle comprises at least one movable wall configured to clamp the at least one heating unit against the side of the test vessel.

2. The heating apparatus of claim 1, wherein the at least one heating unit comprises a heatable plate or a Peltier heater operative to heat and to cool.

3. The heating apparatus of claim 1, wherein the at least one heating unit comprises a pair of heating units configured to heat by direct contact opposite sides of the test vessel.

4. The heating apparatus of claim 1, further comprising an actuator configured to move the at least one movable wall, and a controller configured to operate the actuator.

5. The heating apparatus of claim 1, further comprising a temperature controller configured to receive temperature values from one or more temperature sensors and to control an amount of heat provided by the at least one heating unit in response to the temperature values.

6. The heating apparatus of claim 5, wherein the one or more temperature sensors comprise a thermocouple, resistive temperature device, thermistor, or an infrared sensor.

7. The heating apparatus of claim 1, wherein the at least one heating unit comprises a pliable thermally conductive insulator in contact with the side of the test vessel.

8. The heating apparatus of claim 7, wherein the pliable thermally conductive insulator comprises an elastomer material.

9. A heating apparatus of a specimen testing apparatus, the specimen testing apparatus including a sample rack of bio-liquid containers and an incubator, the heating apparatus comprising:
   a test vessel pre-heating apparatus comprising:
      a receptacle sized to receive a test vessel therein; and
      at least one heating unit positioned inside the receptacle and configured to be in direct contact with, and to heat by direct contact, a side of the test vessel;
      wherein the at least one heating unit comprises:
         a heatable plate or a Peltier heater operative to heat and to cool; and
         a pliable thermally conductive insulator configured to be attached to the heatable plate or Peltier heater and to be in contact with the side of the test vessel.

10. The heating apparatus of claim 9, wherein the pliable thermally conductive insulator comprises an elastomer material.

11. The heating apparatus of claim 9, further comprising a temperature controller configured to receive temperature values from one or more temperature sensors and to control an amount of heat provided by the at least one heating unit in response to the temperature values.

12. The heating apparatus of claim 11, wherein the one or more temperature sensors comprise a thermocouple, resistive temperature device, thermistor, or an infrared sensor.

* * * * *